UNITED STATES PATENT OFFICE.

DMITRY ALEXANDROWITCH PENIAKOFF, OF BRUSSELS, BELGIUM.

PROCESS OF PRODUCING NITROGEN COMPOUNDS OF ALUMINIUM AND ALKALI OR ALKALINE-EARTH METALS.

1,159,989.  Specification of Letters Patent.  Patented Nov. 9, 1915.

No Drawing.  Application filed February 10, 1914.  Serial No. 817,771.

*To all whom it may concern:*

Be it known that I, DMITRY ALEXANDROWITCH PENIAKOFF, a subject of the Emperor of Russia, and a resident of Brussels, Belgium, have invented a new and useful Process of Producing Nitrogen Compounds of Aluminium and Alkali or Alkaline-Earth Metals, of which the following is a specification.

Numerous processes are already known for the production of ammonia by means of nitrids or other nitrogen compounds of metals, such as calcium carbamid, barium cyanid and cyanamid, magnesium nitrid, titanium nitrid and cyanonitrid, aluminium nitrid, silicon nitrid, etc., generally produced by very high temperatures in electric furnaces, by submitting the oxids or their ores mixed with carbon to the direct action of pure nitrogen or of gases containing a large proportion of nitrogen.

My invention relates principally to a process of production of nitrogen compounds of aluminium and alkali or alkaline-earth metals. By means of this process, not only can I produce ammonia, but I recover together also alumina and the alkali or alkaline-earth products.

This process is based upon the following discovery:

1. In the manufacture of raw aluminium nitrid, when the bauxite is replaced by an alkali or alkaline earth metal aluminate or by a mixture which is capable of yielding or generating the same under heat, the absorption of nitrogen becomes much more active and is effected at considerably lower temperatures, and the aluminate is quickly converted into the nitrogen compounds of aluminium and alkali or alkaline-earth metal. It is especially noticeable that this reaction is effected sufficiently energetically at temperatures easily obtainable by direct heating by means of fuel without employment of electric furnaces. However, at the higher temperatures obtainable in these furnaces, the transformation is effected more quickly.

2. When the nitrogen compounds thus produced are subjected to the action of boiling water or steam, the nitrogen is given off as ammonia and the aluminate is re-formed. This aluminate may then be used again to produce nitrogen compounds, or treated as usual to obtain pure alumina and the alkali or alkaline-earth metal products. Moreover, it is noticeable, that under certain conditions of temperature, and especially when an alkali metal aluminate is used, an important proportion of alkali distils and escapes from the furnace and is condensed further as nitrogen compounds (cyanids, etc.). Of course these compounds must be collected in order to be treated either apart or mixed with the products discharged from the furnace in order to obtain ammonia or other nitrogen compounds.

The process is carried out in the following manner: Aluminate is mixed with a quantity of coal corresponding to the whole combined oxygen *i. e.* about 40 per cent. of coal containing as little as possible of volatile compounds. Preferably, this mixture will be made with the substances in powdered or granulated form, and then moistened in order to get a firmly united agglomerate. The treatment with gas of too pulverulent matter will thus be avoided. Moreover, this moistened and compact substance gives immediately when subjected to the heat, a resistant body very porous, and very permeable to the gas. The mixture thus prepared is subjected to the action of nitrogen in a furnace heated either by means of electricity or by combustion of coal or liquid or gaseous fuel. In these latter cases, furnaces comprising a series of chambers or annular furnaces may be used in which the mixture in the agglomerate porous state will be placed as checker work. It is possible too to use furnaces such as coke-ovens or continuous working revolving furnaces heated by direct injection of pulverized coal or by atomizing liquid fuels such as tar or their derivatives, raw naphtha or the residues of its distillation. The gaseous products of the combustion would furnish eventually the nitrogen required for the operation. Of course any other heating means producing a high temperature may be used for the same purpose and must be considered within the scope of the invention. The nitrogen compound thus obtained is then treated in the most convenient manner in order to give off all the combined nitrogen as ammonia or its derivatives, or any other compound of nitrogen. For instance, this may be obtained by treating the nitrogen-compound in autoclaves by water and steam under pressure.

The solid product, pulverulent or not, may also be treated in boilers or other vessels by a steam jet in order to give off ammonia and decompose the cyanids and other nitro-compounds which it may contain.

Of course, in these operations, the aluminate previously produced in a separate operation may be replaced by a mixture of raw material capable of yielding this product by the action of heat, either in electric furnaces or in ordinary fuel furnaces, by adding, either before or afterward, the coal required for the subsequent reduction in the presence of nitrogen. It will be understood, therefore, that in the following claims I use the term "aluminate" in a sufficiently broad sense to include the use of a mixture of substances which yield the aluminate by the action of the heat.

I claim as my invention:

1. A process for the manufacture of nitrogen compounds of aluminium and alkali or alkaline-earth metals, which consists in heating in a current of nitrogen a mixture of carbon and aluminate, substantially as described.

2. A process for the manufacture of nitrogen compounds, of aluminium and alkali or alkaline-earth metals, which consists in heating in a current of nitrogen a mixture of aluminate and carbon in the form of porous agglomerates.

3. A process for the manufacture of nitrogen compounds of aluminium and alkali or alkaline-earth metals, which consists in heating in a current of nitrogen a mixture of coal and aluminate, substantially as described.

4. A process for the manufacture of nitrogen compounds of aluminium and alkali or alkaline-earth metals, which consists in heating in a current of nitrogen a mixture of aluminate and coal in the form of porous agglomerates.

In testimony whereof I have signed my name to this specification, in the presence of two subscribing witnesses.

DMITRY ALEXANDROWITCH PENIAKOFF.

Witnesses:
CHARLES DRURY
EUGÉNE LEGRIS.

Copies of this patent may be obtained for five cents each, by addressing the "Commissioner of Patents, Washington, D. C."